United States Patent
Li et al.

(10) Patent No.: US 9,946,115 B2
(45) Date of Patent: Apr. 17, 2018

(54) LIQUID CRYSTAL DISPLAY PANEL AND METHOD FOR MANUFACTURING THE SAME, DISPLAY DEVICE

(71) Applicants: Xiamen Tianma Micro-Electronics Co., Ltd., Xiamen (CN); Tianma Micro-Electronics Co., Ltd., Shenzhen (CN)

(72) Inventors: Jing Li, Xiamen (CN); Ting Zhou, Xiamen (CN); Poping Shen, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

(*) Notice: Subject to any disclaimer, the term of this patent is extended or adjusted under 35 U.S.C. 154(b) by 60 days.

(21) Appl. No.: 14/957,357

(22) Filed: Dec. 2, 2015

(65) Prior Publication Data

US 2017/0031188 A1 Feb. 2, 2017

(30) Foreign Application Priority Data

Jul. 29, 2015 (CN) .......................... 2015 1 0454172

(51) Int. Cl.
  *G02F 1/1337* (2006.01)
  *G02F 1/1335* (2006.01)

(52) U.S. Cl.
  CPC ...... *G02F 1/1337* (2013.01); *G02F 1/133514* (2013.01); *G02F 1/133528* (2013.01);
  (Continued)

(58) Field of Classification Search
  CPC .. G02F 1/1335; G02F 1/133512; G02F 1/136; G02F 1/1368; G02F 1/133514;
  (Continued)

(56) References Cited

U.S. PATENT DOCUMENTS 6,404,472 B1 * 6/2002 Andreatta ............ G02B 5/3033
  252/585
7,394,512 B2 * 7/2008 Choi ................. G02F 1/133753
  349/106

(Continued)

FOREIGN PATENT DOCUMENTS

| CN | 1356585 A | 7/2002 |
|---|---|---|
| CN | 1386210 A | 12/2002 |
| CN | 1527101 A | 9/2004 |
| CN | 1888966 A | 1/2007 |
| CN | 101126869 A | 2/2008 |
| TW | 482936 B | 4/2002 |

OTHER PUBLICATIONS

Chinese Application No. 201510454172.0, First Office Action dated May 31, 2017.

*Primary Examiner* — Thoi Duong
(74) *Attorney, Agent, or Firm* — Alston & Bird LLP (57) ABSTRACT

A liquid crystal display panel and a method for manufacturing the same, and a display device are provided. The liquid crystal display panel includes: an array substrate, a color film substrate, a liquid crystal layer, a first alignment layer and a second alignment layer. The first alignment layer includes a first alignment region corresponding to an opening region and a second alignment region corresponding to a light shielding region. An alignment direction of the first alignment region is different from an alignment direction of the second alignment region, and an alignment direction of a region in the second alignment layer is parallel to an alignment direction of a region in the first alignment layer corresponding to the region in the second alignment layer. According to the present disclosure, a color mixing and color cast phenomenon in the liquid crystal display panel is alleviated.

15 Claims, 7 Drawing Sheets

(52) U.S. Cl.
CPC .. *G02F 1/133753* (2013.01); *G02F 1/133512* (2013.01); *G02F 1/133788* (2013.01); *G02F 2001/133757* (2013.01)

(58) Field of Classification Search
CPC ............. G02F 1/133528; G02F 1/1337; G02F 1/134336; G02F 1/133753; G02F 1/1362; G02F 1/133723; G02F 1/133784; G02F 1/1333; G02F 1/133711; G02F 2001/134372; G02F 2001/133388; G02F 2001/133519; G02F 2001/133757; G02F 2001/133331; G02F 2201/123; G02F 2201/40; G02F 2201/52; G02F 2201/50
USPC ... 349/106, 110, 123, 129, 43, 96, 128, 132, 349/95
See application file for complete search history.

(56) References Cited

U.S. PATENT DOCUMENTS

| | | | |
|---|---|---|---|
| 7,619,712 B2 * | 11/2009 | Lai | G02F 1/133528 349/162 |
| 7,663,720 B2 * | 2/2010 | Matsui | G02F 1/133528 349/123 |
| 2002/0067449 A1 | 6/2002 | Van De Witte et al. | |
| 2002/0098295 A1 * | 7/2002 | Yip | G02F 1/133788 427/487 |
| 2003/0112393 A1 * | 6/2003 | Watanabe | G02F 1/133753 349/123 |
| 2004/0227881 A1 | 11/2004 | Okazaki et al. | |
| 2006/0132690 A1 | 6/2006 | Choi | |

\* cited by examiner

LIQUID CRYSTAL DISPLAY PANEL AND METHOD FOR MANUFACTURING THE SAME, DISPLAY DEVICE

CROSS REFERENCE OF RELATED APPLICATION

The present application claims the priority to Chinese Patent Application No. 201510454172.0, titled "LIQUID CRYSTAL DISPLAY PANEL AND METHOD FOR MANUFACTURING THE SAME, DISPLAY DEVICE", filed on Jul. 29, 2015 with the State Intellectual Property Office of the PRC, which is incorporated herein by reference in its entirety.

FIELD

The present disclosure relates to the field of liquid crystal display technology, and particularly to a liquid crystal display panel and a method for manufacturing the liquid crystal display panel, and a display device including the liquid crystal display panel.

BACKGROUND

With the development of display technology, pixel per inch (PPI) in a liquid crystal display panel is getting higher. Currently, in order to meet the consumer requirements of the customers for high PPI in the liquid crystal display panel and ensure the great transmissivity of the liquid crystal display panel, a distance between a color film substrate and an array substrate in the liquid crystal display panel is getting smaller. And then a distance between a light shielding layer in the color film substrate and the array substrate is getting smaller, further strength of an electric field under the light shielding layer is getting stronger. Hence, turning range of a liquid crystal molecule between the color film substrate and the array substrate and under the light shielding layer is getting bigger, and a probability of a color mixing and color cast phenomenon in the liquid crystal display panel is increased.

SUMMARY

In order to solve the problem described above, the embodiments of the present disclosure provide a liquid crystal display panel, a method for manufacturing the liquid crystal display panel, and a display device including the liquid crystal display panel. The embodiments of the disclosure alleviate a color mixing and color cast phenomenon in the liquid crystal display panel and reduce the probability of the color mixing and color cast phenomenon in the liquid crystal display panel.

In order to solve the problem described above, the embodiments of the present disclosure provide technical solutions as follows.

A liquid crystal display panel is provided, which includes multiple sub pixel regions, each of the sub pixel regions includes an opening region and a light shielding region surrounding the opening region, the liquid crystal display panel includes:

an array substrate and a color film substrate disposed oppositely;

a liquid crystal layer between the array substrate and the color film substrate;

a first alignment layer on a side of the array substrate facing the liquid crystal layer, where the first alignment layer includes a first alignment region corresponding to the opening region and a second alignment region corresponding to the light shielding region, and an alignment direction of the first alignment region is different from an alignment direction of the second alignment region; and a second alignment layer on a side of the color film substrate facing the liquid crystal layer, where an alignment direction of a region in the second alignment layer is parallel to an alignment direction of a region in the first alignment layer corresponding to the region in the second alignment layer.

A display device including the liquid crystal display panel described above is provided.

A method for manufacturing the liquid crystal display panel described above is provided, the method for manufacturing the liquid crystal display panel includes:

manufacturing an array substrate;

forming a first alignment layer on a surface of the array substrate, where the first alignment layer includes a first alignment region corresponding to an opening region and a second alignment region corresponding to a light shielding region, and an alignment direction of the first alignment region is different from an alignment direction of the second alignment region;

manufacturing a color film substrate;

forming a second alignment layer on a surface of the color film substrate, where an alignment direction of a region in the second alignment layer is parallel to an alignment direction of a region in the first alignment layer corresponding to the region in the second alignment layer; and packaging the array substrate and the color film substrate, and forming a liquid crystal layer between the first alignment layer and the second alignment layer.

Compared with the conventional technology, the technical solutions described above have the following advantages.

The liquid crystal display panel according to the embodiments of the present disclosure includes the array substrate, the color film substrate, the liquid crystal layer, the first alignment layer and the second alignment layer. Specifically, the first alignment layer includes the first alignment region corresponding to the opening region in the liquid crystal display panel and the second alignment region corresponding to the light shielding region in the liquid crystal display panel. The alignment direction of the first alignment region is different from the alignment direction of the second alignment region, and the alignment direction of a region in the second alignment layer is parallel to the alignment direction of a region in the first alignment layer corresponding to the region in the second alignment layer, so that after liquid crystal molecules in the liquid crystal layer turn when a voltage is applied to two sides of the liquid crystal layer, an angle between a long axis of the liquid crystal molecule in the opening region and a light transmitting direction is different from an angle between a long axis of the liquid crystal molecule in the light shielding region and the light transmitting direction. In this way, the color mixing and color cast phenomenon in the liquid crystal display panel is alleviated, and the probability of the color mixing and color cast phenomenon in the liquid crystal display panel is reduced.

BRIEF DESCRIPTION OF THE DRAWINGS

In order to illustrate the technical solutions in the embodiments of the present disclosure or in the conventional technology more clearly, in the following, drawings required in the description of the embodiments or the conventional technology will be introduced briefly. The drawings in the following description illustrate just some embodiments of the disclosure. For those skilled in the art, other drawings can also be obtained according to the drawings without any creative work.

DETAILED DESCRIPTION

Hereinafter, the technical solutions in the embodiments of the present disclosure will be described clearly and completely in conjunction with the drawings in the embodiments of the present disclosure. The described embodiments are only a part of the embodiments of the present disclosure, but not all the embodiments. All the other embodiments obtained by those skilled in the art based on the embodiments of the present disclosure without creative work will fall within the protection scope of the present disclosure.

Specific details are described in the following description so that the present disclosure can be understood completely. However, the present disclosure may also be embodied in other ways, a similar extension can be made by those skilled in the art without departing from intension of the present disclosure. Therefore, the present disclosure is not limited to the specific embodiments described below.

As described in the Background, with the development of display technology, pixel per inch (PPI) in a liquid crystal display panel is getting higher, and the distance between the light shielding layer in the color film substrate and the array substrate is getting smaller. As a result, the probability of the color mixing and color cast phenomenon in the liquid crystal display panel is getting greater.

Figure 1:
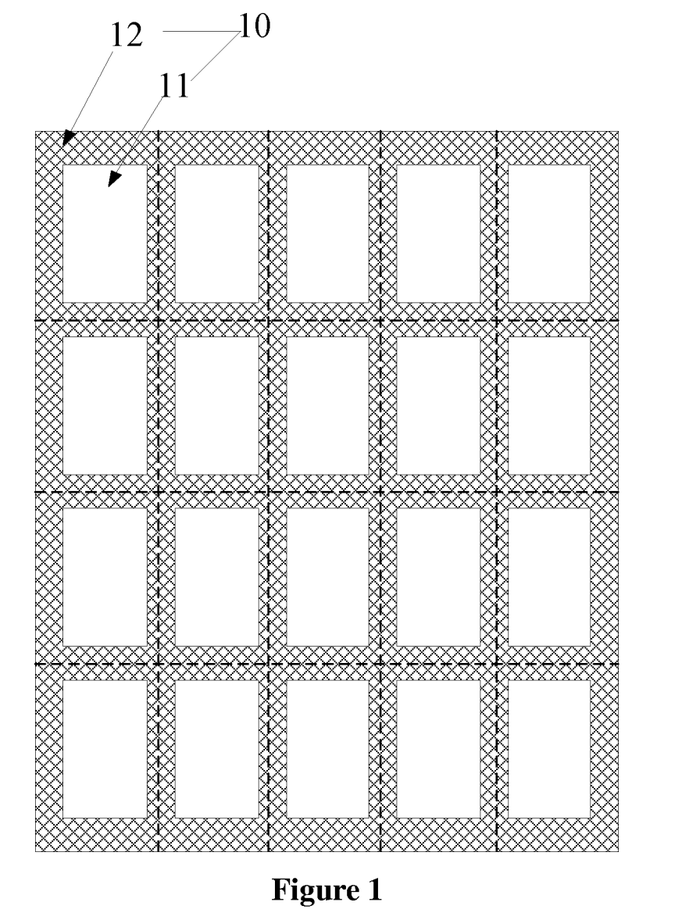
FIG. 1 is a plan view of a liquid crystal display panel according to an embodiment of the present disclosure.
Figure 2:
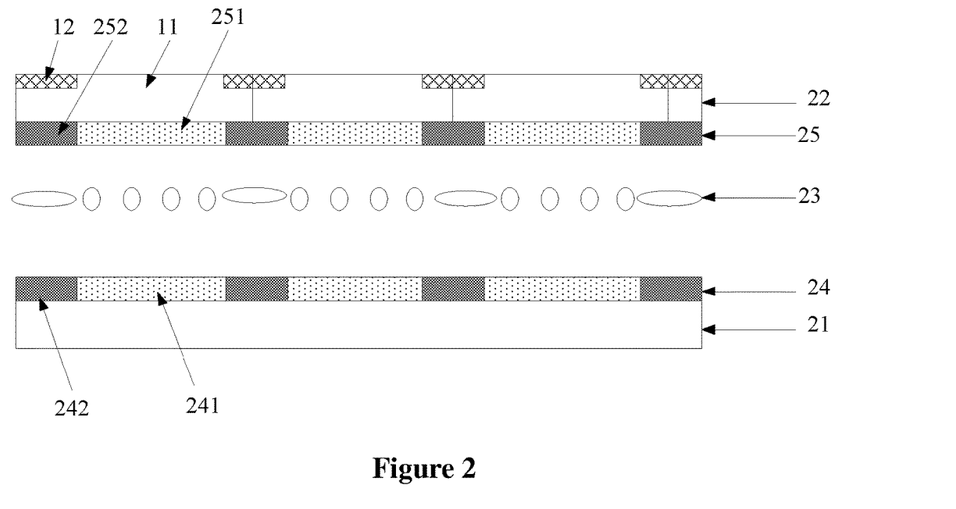
FIG. 2 is a sectional view of a liquid crystal display panel according to an embodiment of the present disclosure.
Figure 3:
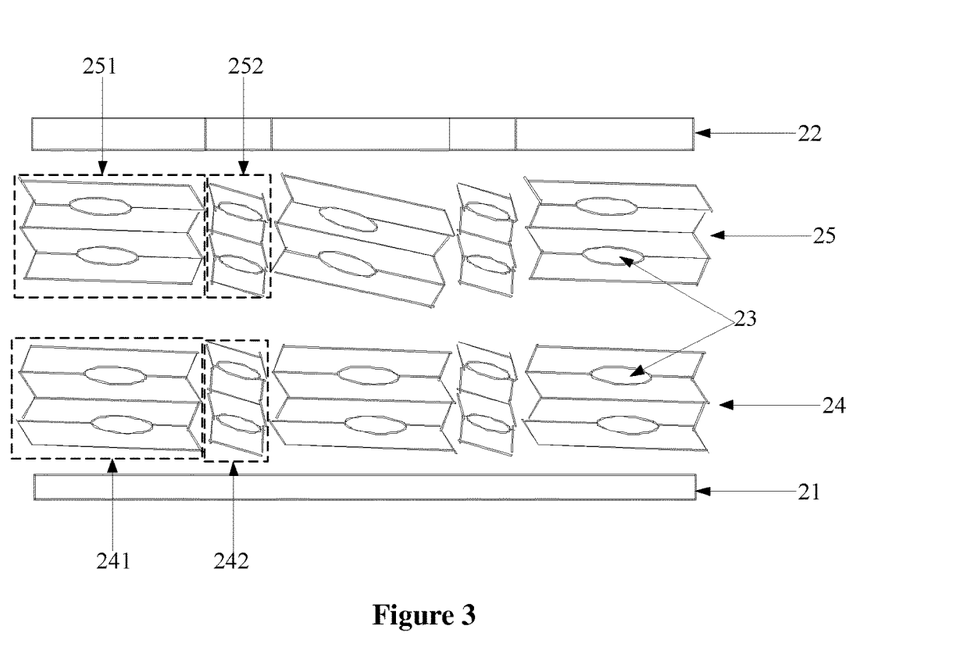
FIG. 3 is a schematic diagram of alignment directions of a first alignment layer and a second alignment layer in a liquid crystal display panel according to an embodiment of the present disclosure.

In view of this, a liquid crystal display panel is provided in the embodiments of the present disclosure. As shown in FIG. 1, which is a plan view of the liquid crystal display panel, the liquid crystal display panel includes multiple sub pixel regions 10, each of the sub pixel regions 10 includes an opening region 11 and a light shielding region 12 surrounding the opening region 11. As shown in FIG. 2, which is a sectional diagram of the liquid crystal display panel, the liquid crystal display panel includes: an array substrate 21 and a color film substrate 22 disposed oppositely; a liquid crystal layer 23 between the array substrate 21 and the color film substrate 22; a first alignment layer 24 between the array substrate 21 and the liquid crystal layer 23; and a second alignment layer 25 between the color film substrate 22 and the liquid crystal layer 23. Specifically, the first alignment layer 24 includes a first alignment region 241 corresponding to the opening region 11 and a second alignment region 242 corresponding to the light shielding region 12. As shown in FIG. 3, an alignment direction of the first alignment region 241 is different from an alignment direction of the second alignment region 242, and an alignment direction of a region in the second alignment layer 25 is parallel to an alignment direction of a region in the first alignment layer 24 corresponding to the region in the second alignment layer 25.

Specifically, in an embodiment of the present disclosure, the second alignment layer 25 includes a third alignment region 251 corresponding to the opening region 11 and a fourth alignment region 252 corresponding to the light shielding region 12. Specifically, an alignment direction of the third alignment region 251 is parallel to the alignment direction of the first alignment region 241, and an alignment direction of the fourth alignment region 252 is parallel to the alignment direction of the second alignment region 242.

Taking an IPS (In-plain Switch) liquid crystal display panel as an example, in an embodiment of the present disclosure, the transmissivity of the liquid crystal display panel is calculated as follows, $$T = \frac{1}{2}\sin^2(2\psi)\sin^2(\pi \Delta n d / \lambda)$$

where T represents the transmissivity of the liquid crystal display panel, ψ represents a turning angle of a liquid crystal molecule in the liquid crystal layer 23, d represents the thickness of the liquid crystal layer 23, λ represents the wavelength of incident light on the liquid crystal display panel, Δn represents a difference of a refractivity between a long axis and a short axis of the liquid crystal molecule.

As can be seen from the calculation formula described above, it is assumed that an initial placement direction for the liquid crystal molecule is a horizontal direction: in a case that the turning angle of the liquid crystal molecule is 45 degrees, the transmissivity of the liquid crystal display panel is the greatest; in a case that the turning angle of the liquid crystal molecule is 0 degrees, the transmissivity of the liquid crystal display panel is the least; and in a case that the turning angle of the liquid crystal molecule is less than 45 degrees, the less the turning angle of the liquid crystal molecule, the less the transmissivity of the liquid crystal display panel. Therefore, the less the turning angle of the liquid crystal molecule under the light shielding region 12, in a vertical direction or an oblique direction, the less the transmissivity of the light shielding region 12, the poorer a light leakage phenomenon in the light shielding region 12, and the lighter the color mixing phenomenon in the liquid crystal display panel.

Therefore, in the liquid crystal display panel according to an embodiment of the present disclosure, the alignment direction of the first alignment region 241 in the first alignment layer 24 is set to be different from the alignment direction of the second alignment region 242 in the first alignment layer 24, so that initial placement angles of liquid crystal molecules in the liquid crystal display panel are different. Angles of the liquid crystal molecules with respect to a light transmitting direction in the liquid crystal display panel are different in a case that the liquid crystal molecules in the liquid crystal layer 23 turns by the same degrees when a voltage is applied to two sides of the liquid crystal layer 23. Therefore, by setting the alignment directions of the first alignment region 241 and the second alignment region 242 in the first alignment layer 24, the light leakage phenomenon in the light shielding region 12 of the liquid crystal display panel is weakened, the color mixing and color cast phenomenon in the liquid crystal display panel are alleviated, and the probability of the color mixing and color cast phenomenon in the liquid crystal display panel is reduced.

Based on the embodiments described above, in a preferred embodiment, each of the sub pixel regions includes at least one pixel electrode. An angle $\theta1$ between the alignment direction of the first alignment region 241 and an extension direction of the pixel electrode and an angle $\theta2$ between the alignment direction of the second alignment region 242 and the extension direction of the pixel electrode meet the following formula: $0°<\theta2-\theta1\leq10°$. In other embodiments of the present disclosure, the value of $\theta2-\theta1$ may be other degrees, which is not limited in the present disclosure. As long as $\theta2$ is greater than $\theta1$, an angle between a long axis of the liquid crystal molecule in the opening region 11 and the light transmitting direction is less than an angle between a long axis of the liquid crystal molecule in the light shielding region 12 and the light transmitting direction after the liquid crystal molecules in the liquid crystal layer 23 turn when the voltage is applied to two sides of the liquid crystal layer 23. Therefore, the light leakage phenomenon in the light shielding region 12 is weakened, the color mixing and color cast phenomenon in the liquid crystal display panel is alleviated, and the probability of the color mixing and color cast phenomenon in the liquid crystal display panel is reduced.

Figure 4:
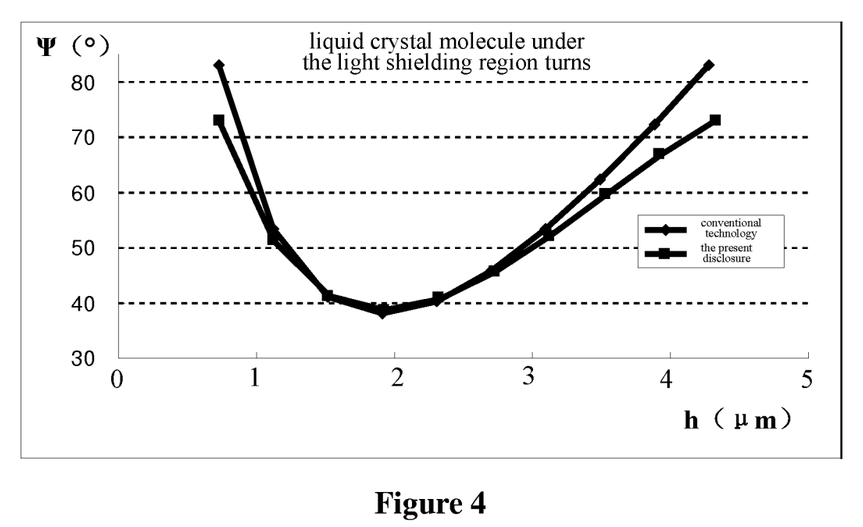
FIG. 4 is a relation curve diagram of a height h of a liquid crystal molecule at a center region within a light shielding region from an array substrate and an angle ψ by which the liquid crystal molecule turns with respect to a horizontal direction under the effect of an electric field in a case that a liquid crystal display panel in the conventional technology and a liquid crystal display panel according to an embodiment of the present disclosure are driven.

Specifically, in an embodiment of the present disclosure, an angle between the alignment direction of the first alignment region 241 and the horizontal direction (vertical to the extension direction of the pixel electrode) is 73 degrees, and an angle between the alignment direction of the second alignment region 242 and the horizontal direction is 83 degrees. As shown in FIG. 4, which is a relation curve diagram of a height h of a liquid crystal molecule at a center region within the light shielding region from the array substrate and an angle $\psi$ by which the liquid crystal molecule turns with respect to the horizontal direction under the effect of an electric field in a case that the liquid crystal display panel in the conventional technology and the liquid crystal display panel according to an embodiment of the present disclosure are driven. Specifically, the horizontal axis represents the height h of the liquid crystal molecule at the center region within the light shielding region from the array substrate, and the vertical axis represents the angle $\psi$ by which the liquid crystal molecule turns with respect to the horizontal axis in a case that the liquid crystal display panel is driven. As can be seen from FIG. 4, for the liquid crystal molecule at the center region within the light shielding region, the relation curve diagram of the angle by which the liquid crystal molecule turns with respect to the horizontal direction in a case that the liquid crystal display panel according to an embodiment is driven is basically consistent with the relation curve diagram of the angle by which the liquid crystal module turns with respect to the horizontal direction in a case that the liquid crystal display panel in the conventional technology is driven.

Figure 5:
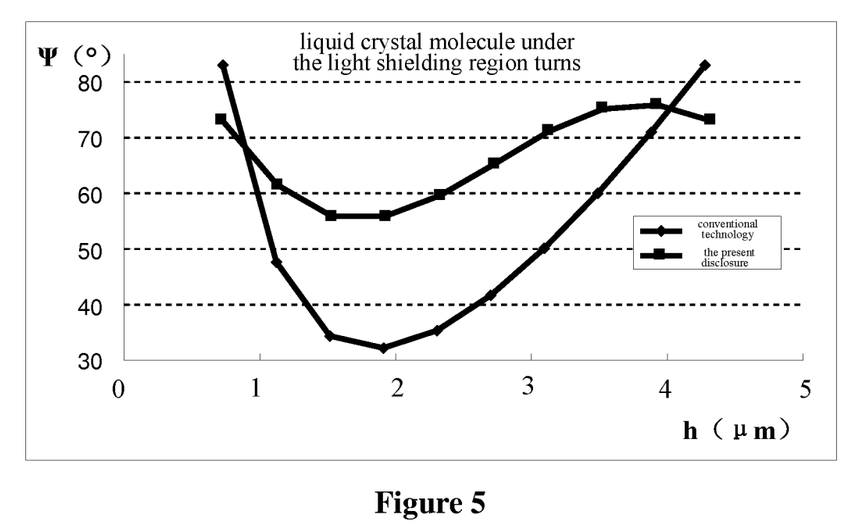
FIG. 5 is a relation curve diagram of a height h of a liquid crystal molecule at a region close to an opening region within a light shielding region from an array substrate and an angle ψ by which the liquid crystal molecule turns with respect to a horizontal direction under the effect of an electric field in a case that a liquid crystal display panel in the conventional technology and a liquid crystal display panel according to an embodiment of the present disclosure are driven.

As shown in FIG. 5, which is a relation curve diagram of a height h of a liquid crystal molecule at a region close to the opening region within the light shielding region from the array substrate and an angle $\psi$ by which the liquid crystal molecule turns with respect to the horizontal direction under the effect of an electric field in a case that the liquid crystal display panel in the conventional technology and the liquid crystal display panel according to an embodiment of the present disclosure are driven. Specifically, the horizontal axis represents the height h of the liquid crystal molecule at the region close to the opening region within the light shielding region from the array substrate, and the vertical axis represents the angle $\psi$ by which the liquid crystal molecule turns with respect to the horizontal axis in a case that the liquid crystal display panel is driven. As can be seen from FIG. 5, in a case that the liquid crystal display panel in the conventional technology is driven, angles of a part of the liquid crystal molecules at the region close to the opening region within the light shielding region with respect to the horizontal direction are near 45 degrees, and even angles of a part of the liquid crystal molecules with respect to the horizontal direction are 45 degrees. In a case that the liquid crystal display panel according to an embodiment of the present disclosure is driven, angles of the liquid crystal molecules at the region close to the opening region within the light shielding region with respect to the horizontal direction are approximately 55 degrees at least, and the angles of the liquid crystal molecules with respect to the horizontal direction do not include 45 degrees. As can be known from the calculation formula for the transmissivity of the liquid crystal display panel, in a case that the angle of the liquid crystal molecule with respect to the horizontal direction is 45 degrees, the transmissivity is the greatest, and the light leakage phenomenon is the most serious. Therefore, using the liquid crystal display panel according to an embodiment of the present disclosure, the light leakage phenomenon in the light shielding region 12 is weakened, and the color mixing and color cast phenomenon in the liquid crystal display panel is greatly alleviated. As a result, the probability of the color mixing and color cast phenomenon in the liquid crystal display panel is reduced.

Furthermore, in the liquid crystal display panel according to an embodiment of the present disclosure, initial alignment directions of the first alignment region 241 and the second alignment region 242 are set reasonably, and then an object of light shielding can be realized. Therefore a light shielding layer is not necessary in the liquid crystal display panel according to an embodiment of the present disclosure, and a manufacture procedure for the liquid crystal display panel is simplified, and production efficiency for the liquid crystal display panel is improved, and cost of the liquid crystal display panel is reduced.

Figure 6:
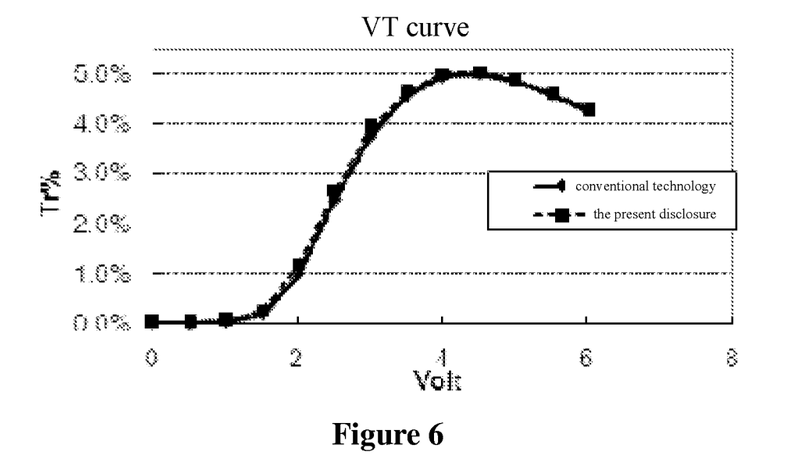
FIG. 6 is a schematic curve diagram of voltage-transmissivity of a liquid crystal display panel in the conventional technology and a liquid crystal display panel according to an embodiment of the present disclosure.
Figure 7:
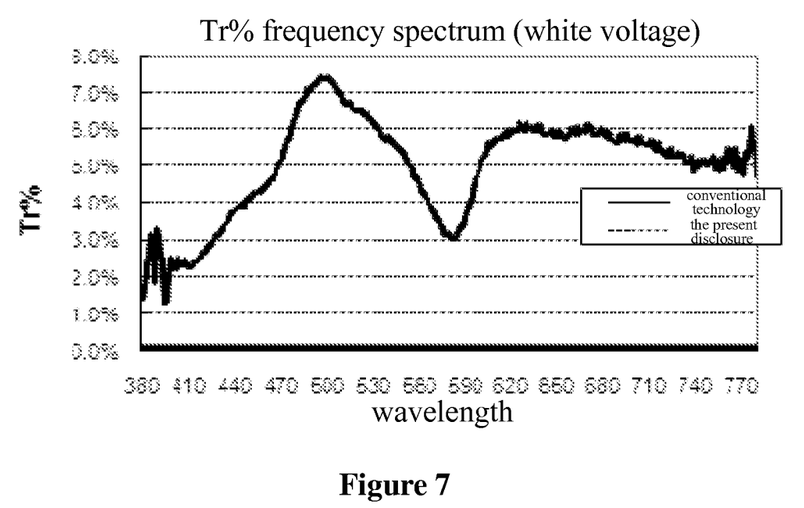
FIG. 7 is a schematic curve diagram of incident wavelength-transmissivity of a liquid crystal display panel in the conventional technology and a liquid crystal display panel according to an embodiment of the present disclosure.

As shown in FIG. 6 and FIG. 7, FIG. 6 is a schematic curve diagram of voltage-transmissivity of the liquid crystal display panel in the conventional technology and the liquid crystal display panel according to an embodiment of the present disclosure, and FIG. 7 is a schematic curve diagram of incident wavelength-transmissivity of the liquid crystal display panel in the conventional technology and the liquid crystal display panel according to an embodiment of the present disclosure. As can be seen from FIG. 6 and FIG. 7, the curves of the voltage-transmissivity and the incident wavelength-transmissivity of the liquid crystal display panel according to an embodiment of the present disclosure is consistent with the curves of the voltage-transmissivity and the incident wavelength-transmissivity of the liquid crystal display panel in the conventional technology respectively. That is, the transmissivity of the liquid crystal display panel according to an embodiment of the present disclosure is basically consistent with the transmissivity of the liquid crystal display panel in the conventional technology.

It should be noted that, in other embodiments of the present disclosure, alternatively, each of the sub pixel regions may include multiple pixel electrodes, which is not limited in the present disclosure, as the case may be.

Based on any one of embodiments described above, in an embodiment of the present disclosure, the first alignment region 241 includes multiple sub alignment regions, and the sub alignment regions have a one-to-one correspondence with multiple sub pixels, and alignment directions of the sub alignment regions are identical.

It should be noted that requirements of different sub pixels in the liquid crystal display panel for the transmissivity may be not completely identical. The first alignment region 241 includes multiple sub alignment regions in another embodiment of the present disclosure, and the sub alignment regions have a one-to-one correspondence with multiple sub pixels, the alignment directions of the sub alignment regions are not completely identical, to meet different requirements of different sub pixels for the transmissivities, which is not limited in the present disclosure, as the case may be.

Based on the embodiments described above, in an embodiment of the present disclosure, the multiple sub pixels include a first sub pixel, a second sub pixel and a third sub pixel. The first alignment region 241 includes a first sub alignment region corresponding to the first sub pixel, a second sub alignment region corresponding to the second sub pixel and a third sub alignment region corresponding to the third sub pixel.

Based on the embodiments described above, in a case that the alignment directions of the sub alignment regions in the first alignment region 241 are not completely identical, in an embodiment of the present disclosure, the first sub alignment region has a same alignment direction, the second sub alignment region has a same alignment direction, and the third sub alignment region has a same alignment direction. In an embodiment of the present disclosure, the alignment direction of the first sub alignment region is different from the alignment direction of the second sub alignment region. In another embodiment of the present disclosure, the alignment direction of the second sub alignment region is different from the alignment direction of the third sub alignment region. In another embodiment of the present disclosure, the alignment direction of the first sub alignment region is different from the alignment direction of the third sub alignment region. In another embodiment of the present disclosure, the alignment direction of the first sub alignment region is different from the alignment direction of the second sub alignment region, and is different from the alignment direction of the third sub alignment region. In another embodiment of the present disclosure, the alignment direction of the first sub alignment region is different from the alignment direction of the second sub alignment region, and the alignment direction of the second sub alignment region is different from the alignment direction of the third sub alignment region. In another embodiment of the present disclosure, the alignment direction of the first sub alignment region is different from the alignment direction of the third sub alignment region, and the alignment direction of the second sub alignment region is different from the alignment direction of the third sub alignment region.

It should be noted that, requirements for the transmissivity at different locations within one sub pixel in the liquid crystal display panel may be not completely identical. Based on any one of the embodiments described above, in an embodiment of the present disclosure, alignment directions of regions corresponding to different locations within the first sub pixel within the first sub alignment region are not completely identical, or alignment directions of regions corresponding to different locations within the second sub pixel within the second sub alignment region are not completely identical, or alignment directions of regions corresponding to different locations within the third sub pixel within the third sub alignment region are not completely identical. In another embodiment of the present disclosure, the alignment directions of regions corresponding to different locations within the first sub pixel within the first sub alignment region are not completely identical, and the alignment directions of regions corresponding to different locations within the second sub pixel within the second sub alignment region are not completely identical. In another embodiment of the present disclosure, the alignment directions of regions corresponding to different locations within the first sub pixel within the first sub alignment region are not completely identical, and the alignment directions of regions corresponding to different locations within the third sub pixel within the third sub alignment region are not completely identical. In another embodiment of the present disclosure, the alignment directions of regions corresponding to different locations within the second sub pixel within the second sub alignment region are not completely identical, and the alignment directions of regions corresponding to different locations within the third sub pixel within the third sub alignment region are not completely identical. In another embodiment of the present disclosure, the alignment directions of regions corresponding to different locations within the first sub pixel within the first sub alignment region are not completely identical, the alignment directions of regions corresponding to different locations within the second sub pixel within the second sub alignment region are not completely identical, and the alignment directions of regions corresponding to different locations within the third sub pixel within the third sub alignment region are not completely identical, which is not limited in the present disclosure, as the case may be.

Based on any one of the embodiments described above, in an embodiment of the present disclosure, the liquid crystal display panel further includes a first polarizer (not shown) on a side of the array substrate deviating from the liquid crystal layer and a second polarizer (not shown) on a side of the color film substrate deviating from the liquid crystal layer, to polarize incident light on the liquid crystal display panel.

It should be noted that, in an embodiment of the present disclosure, the first alignment layer 24 is doped with a dichroic dye, to give the first alignment layer 24 a polarization effect. Therefore, the first polarizer may be omitted, a structure of the liquid crystal display panel may be simplified, and the thickness of the liquid crystal display panel may be reduced. In another embodiment, a polarization effect of the first polarizer may be superimposed by the polarization effect of the first alignment layer 24, polarization performance of the liquid crystal display panel may be improved, incident light on a region corresponding to the light shielding region 12 in the liquid crystal display panel is blocked, the light leakage phenomenon in the liquid crystal display panel is improved, and contrast of the liquid crystal display panel is improved. In another embodiment of the present disclosure, the second alignment layer 25 is doped with a dichroic dye, so that the second alignment layer 25 has a polarization effect. Therefore, the second polarizer may be omitted, the structure of the liquid crystal display panel may be simplified, and the thickness of the liquid crystal display panel may be reduced. In another embodiment, the polarization effect of the second polarizer may be superimposed by the polarization effect of the second alignment layer 25, the polarization performance of the liquid crystal display panel may be improved, incident light on a region corresponding to the light shielding region 12 in the liquid crystal display panel is blocked, the light leakage phenomenon in the liquid crystal display panel is improved, and the contrast of the liquid crystal display panel is improved. In another embodiment of the present disclosure, the first alignment layer 24 is doped with a dichroic dye, and the second alignment layer 25 is doped with a dichroic dye, so that the first alignment layer 24 and the second alignment layer 25 both have the polarization effect. Therefore the first polarizer and/or the second polarizer may be omitted, the structure of the liquid crystal display panel may be simplified, and the thickness of the liquid crystal display panel may be reduced; or the polarization effect of the first polarizer and/or the second polarizer may be superimposed by the polarization effect of the first alignment layer 24 and the second alignment layer 25, and the polarization performance of the liquid crystal display panel is further improved, incident light on a region corresponding to the light shielding region 12 in the liquid crystal display panel is blocked, the light leakage phenomenon in the liquid crystal display panel is improved, and the contrast of the liquid crystal display panel is improved.

It should also be noted that, in an embodiment of the present disclosure, in a case that the first alignment layer 24 is doped with a dichroic dye and the second alignment layer 25 is not doped with a dichroic dye, the alignment direction of a region in the first alignment layer 24 may be identical to the polarization direction of the region in the first alignment layer 24. In this way, regional alignment and regional polarization may be performed on the first alignment layer 24 in one process, thereby simplifying the process of the liquid crystal display panel, which is not limited in the present disclosure. In other embodiments of the present disclosure, the alignment direction of a region in the first alignment layer 24 may be different from the polarization direction of the region in the first alignment layer 24.

In another embodiment of the present disclosure, in a case that the second alignment layer 25 is doped with a dichroic dye and the first alignment layer 24 is not doped with a dichroic dye, the alignment direction of a region in the second alignment layer 25 may be identical to the polarization direction of the region in the second alignment layer 25, such that regional alignment and regional polarization may be performed on the second alignment layer 25 in one process, to simplify the process of the liquid crystal display panel, which is not limited in the present disclosure. In other embodiments of the present disclosure, the alignment direction of a region in the second alignment layer 25 may be different from the polarization direction of the region in the second alignment layer 25.

In another embodiment of the present disclosure, the first alignment layer 24 and the second alignment layer 25 in the liquid crystal display panel both are doped with a dichroic dye. In an embodiment of the present disclosure, the alignment direction of a region in the first alignment layer 24 is identical to the polarization direction of the region in the first alignment layer 24, and the alignment direction of a region in the second alignment layer 25 is vertical to the polarization direction of the region in the second alignment layer 25. In another embodiment of the present disclosure, the alignment direction of a region in the first alignment layer 24 is vertical to the polarization direction of the region in the first alignment layer 24, and the alignment direction of a region in the second alignment layer 25 is parallel to the polarization direction of the region in the second alignment layer 25. In other embodiments of the present disclosure, an angle may be formed between the alignment direction of a region in the first alignment layer 24 and the polarization direction of the region in the first alignment layer 24. Similarly, an angle may be formed between the alignment direction of a region in the second alignment layer 25 and the polarization direction of the region in the second alignment layer 25, which is not limited in the present disclosure, as long as that the alignment direction of a region in the first alignment layer 24 is parallel to the alignment direction of a region in the second alignment layer 25 corresponding to the region in the first alignment layer 24, and the polarization direction of a region in the first alignment layer 24 is vertical to the polarization direction of a region in the second alignment layer 25 corresponding to the region in the first alignment layer 24.

It should also be noted that, in a case when a voltage is applied to two sides of the liquid crystal layer 23 in the liquid crystal display panel, the liquid crystal molecule in the liquid crystal layer 23 turns. Although there is no pixel electrode at the light shielding region 12, the liquid crystal molecule in the light shielding region 12 turns by a certain angle under the effect of an electric field at opening region 11 near the light shielding region 12. Therefore, the light leakage phenomenon still exists in the liquid crystal display panel, and the color mixing and color cast phenomenon occurs in the liquid crystal display panel.

Figure 8:
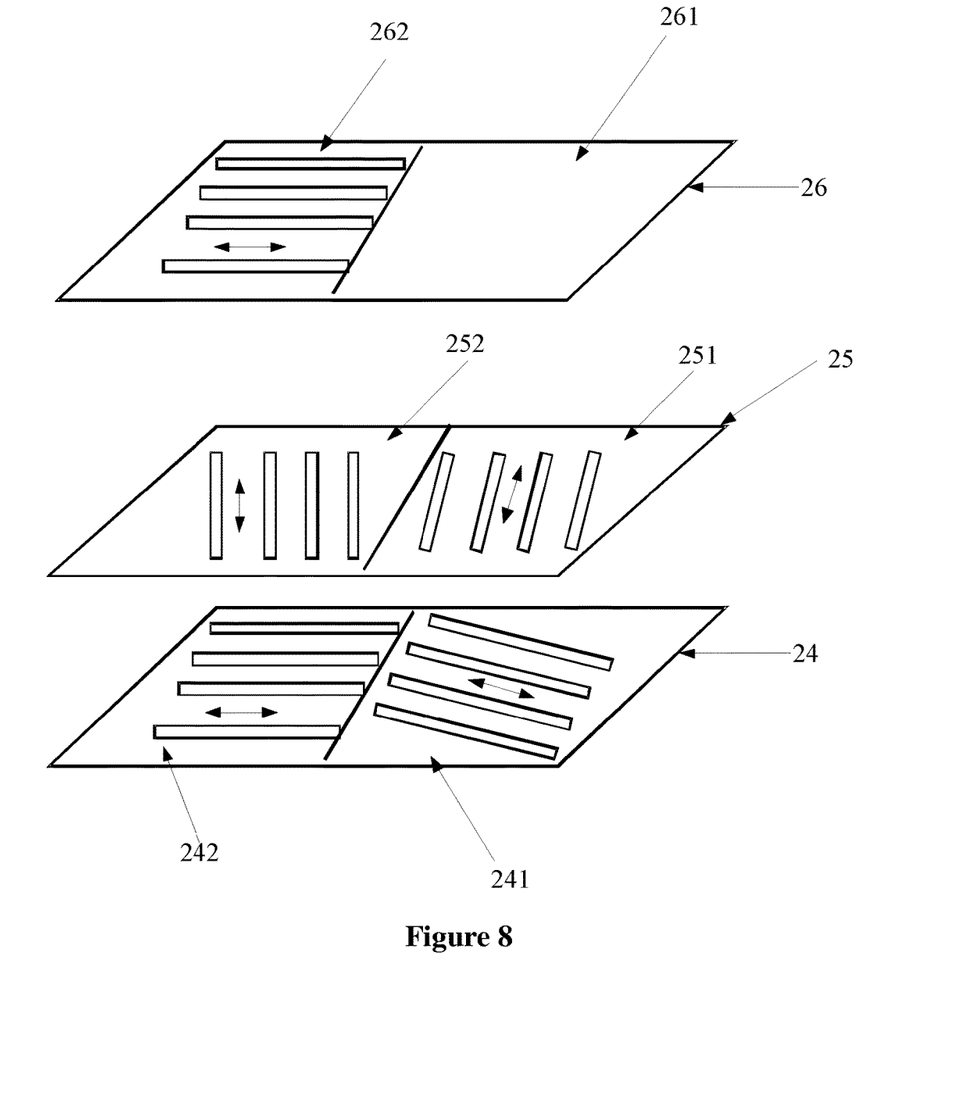
FIG. 8 is a schematic diagram of alignment directions of a first alignment layer, a second alignment layer and a cover plate in a liquid crystal display panel according to an embodiment of the present disclosure.

In view of this, based on any one of the embodiments of the present disclosure, in an embodiment of the present disclosure, as shown in FIG. 8, the liquid crystal display panel further includes a cover plate 26 disposed on a side of the color film substrate 22 deviating from the liquid crystal layer 23, the cover plate 26 has a polarization effect at a location 262 corresponding to the light shielding region 12 in the cover plate 26, to filter out light transmitted through the color film substrate 22 from the array substrate 21, and further alleviate the color mixing and color cast phenomenon in the liquid crystal display panel and reduce the probability of the color mixing and color cast phenomenon in the liquid crystal display panel.

Based on the embodiments described above, in an embodiment of the present disclosure, the first alignment layer 24 is not doped with a dichroic dye and the second alignment layer 25 is doped with a dichroic dye, the polarization direction at the location corresponding to the light shielding region 12 in the cover plate 26 is vertical to the polarization direction at a location corresponding to the light shielding region 12 in the second alignment layer 25, which is not limited in the present disclosure, as the case may be.

Based on the embodiments described above, in an embodiment of the present disclosure, the cover plate 26 is doped with a dichroic dye at the location 262 corresponding to the light shielding region 12 in the cover plate 26, so that the cover plate 26 has a polarization effect at the location 262 corresponding to the light shielding region 12 in the cover plate 26, which is not limited in the present disclosure. In other embodiments of the present disclosure, alternatively, the cover plate 26 may have the polarization effect in other ways, as the case may be.

Figure 9:
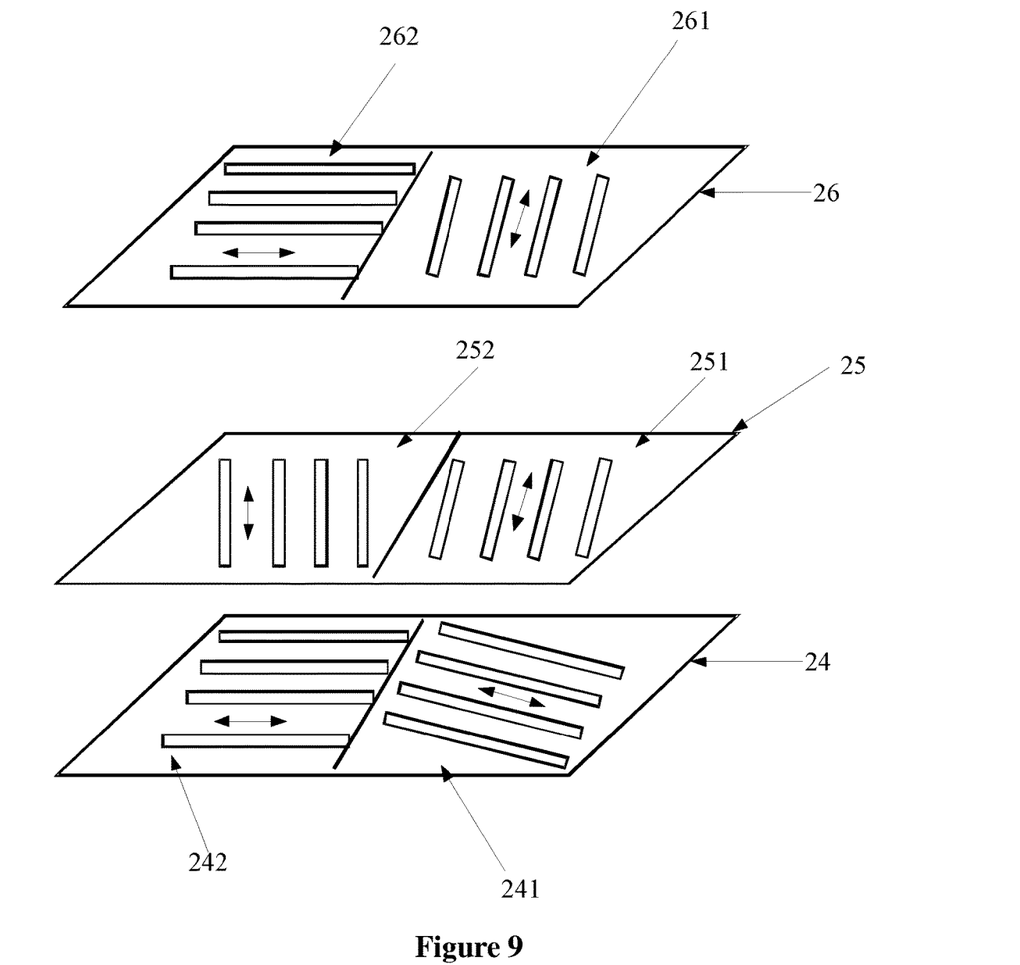
FIG. 9 is a schematic diagram of alignment directions of a first alignment layer, a second alignment layer and a cover plate in a liquid crystal display panel according to another embodiment of the present disclosure.

Based on the embodiments described above, in an embodiment of the present disclosure, as shown in FIG. 8, the cover plate 26 does not have the polarization effect at the location 261 corresponding to the opening region 11 in the cover plate 26. In another embodiment of the present disclosure, as shown in FIG. 9, the cover plate 26 has the polarization effect at the location 261 corresponding to the opening region 11 in the cover plate 26, which is not limited in the present disclosure, as the case may be. It should be noted that, in a case that the cover plate 26 has the polarization effect at the location 261 corresponding to the opening region 11 in the cover plate 26, the polarization direction at the location 261 corresponding to the opening region 11 in the cover plate 26 is vertical to the polarization direction of the first alignment region 241 in the first alignment layer 24, and is identical to the polarization direction of the third alignment region 251 in the second alignment layer 25. Therefore, light transmitted through the color film substrate 22 from the array substrate 21 can be transmitted through the cover plate completely.

Based on the embodiments described above, in a preferred embodiment of the present disclosure, in a case that the cover plate 26 has the polarization effect at the location 261 corresponding to the opening region 11 in the cover plate 26, the cover plate 26 is doped with a dichroic dye at the location 261 corresponding to the opening region 11 in the cover plate 26, so that the cover plate 26 has the polarization effect at the location 261 corresponding to the opening region 11 in the cover plate 26, which is not limited in the present disclosure. Alternatively, the cover plate 26 may have the polarization effect at the location 261 corresponding to the opening region 11 in the cover plate 26 in other ways, as the case may be.

Figure 10:
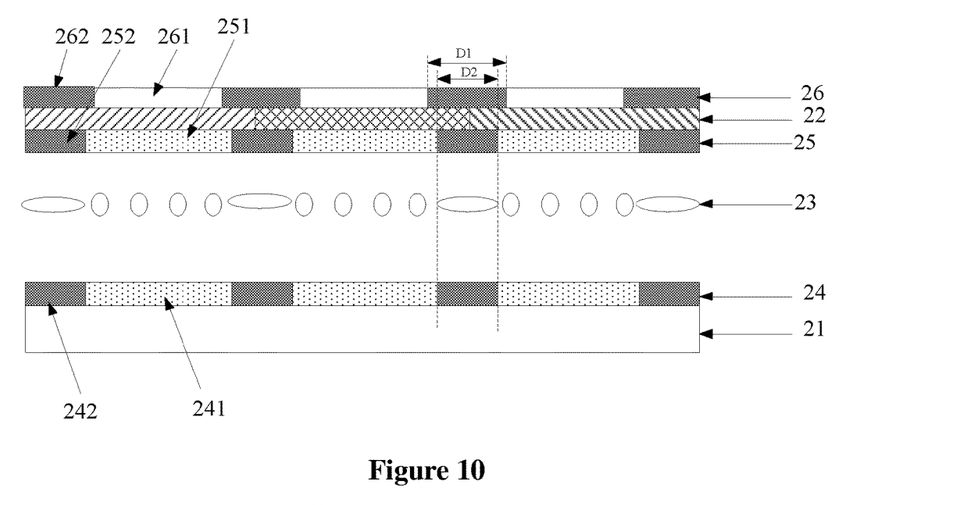
FIG. 10 is a schematic structural diagram of a liquid crystal display panel according to another embodiment of the present disclosure.

Based on the embodiments described above, in an embodiment of the present disclosure, as shown in FIG. 10, in a case that the cover plate 26 has the polarization effect at the location 262 corresponding to the light shielding region 12 in the cover plate 26, a width D1 of the cover plate 26 at the location 262 corresponding to the light shielding region 12 in the cover plate 26 is not less than a width D2 of the color film substrate 22 at a location corresponding to the light shielding region 12 in the color film substrate 22. It should be noted that there is a distance, for example 1 μm to 3 μm, between the second alignment layer 25 and the cover plate 26, a beam angle is increased to some extent in a case that light transmitted through the second alignment layer 25 irradiates onto the cover plate 26. Therefore, based on the embodiments described above, in a preferred embodiment of the present disclosure, in a case that the cover plate 26 has the polarization effect at the location corresponding to the light shielding region 12 in the cover plate 26, the width D1 of the cover plate 26 at the location corresponding to the light shielding region 12 in the cover plate 26 is greater than the width D2 of the color film substrate 22 at a location corresponding to the light shielding region 12 in the color film substrate 22, which is not limited in the present disclosure, as the case may be.

Based on any one of the embodiments described above, in a preferred embodiment of the present disclosure, the dichroic dye includes one or more of an azo-dye, an anthraquinone dye, a biphenyl dye, a triphenyl dioxazine and derivative dye, a monomethine dye, a polymethine dye and a polycyclic dye, which is not limited in the present disclosure, as the case may be.

The embodiments of the present disclosure further provide a display device including the liquid crystal display panel according to any one of the embodiments described above.

As can be known from the above description, the liquid crystal display panel and the display device according to the embodiments of the present disclosure include the array substrate, the color film substrate, the liquid crystal layer, the first alignment layer and the second alignment layer. Specifically, the first alignment layer includes the first alignment region corresponding to the opening region in the liquid crystal display panel and the second alignment region corresponding to the light shielding region in the liquid crystal display panel. The alignment direction of the first alignment region is different from the alignment direction of the second alignment region, the alignment direction of a region in the second alignment layer is parallel to the alignment direction of a region in the first alignment layer corresponding to the region in the second alignment layer, so that after liquid crystal molecules in the liquid crystal layer turn when the voltage is applied to two sides of the liquid crystal layer, an angle between a long axis of the liquid crystal molecule in the opening region and a light transmitting direction is different from an angle between a long axis of the liquid crystal molecule in the light shielding region and the light transmitting direction. In this way, the color mixing and color cast phenomenon in the liquid crystal display panel is alleviated, and the probability of the color mixing and color cast phenomenon in the liquid crystal display panel is reduced.

Furthermore, in the liquid crystal display panel according to an embodiment of the present disclosure, initial alignment directions of the first alignment region and the second alignment region are set reasonably, and then an object of light shielding can be realized. Therefore a light shielding layer is not necessary in the liquid crystal display panel according to an embodiment of the present disclosure, and a manufacture procedure for the liquid crystal display panel is simplified, and production efficiency for the liquid crystal display panel is improved, and cost of the liquid crystal display panel is reduced.

Figure 11:
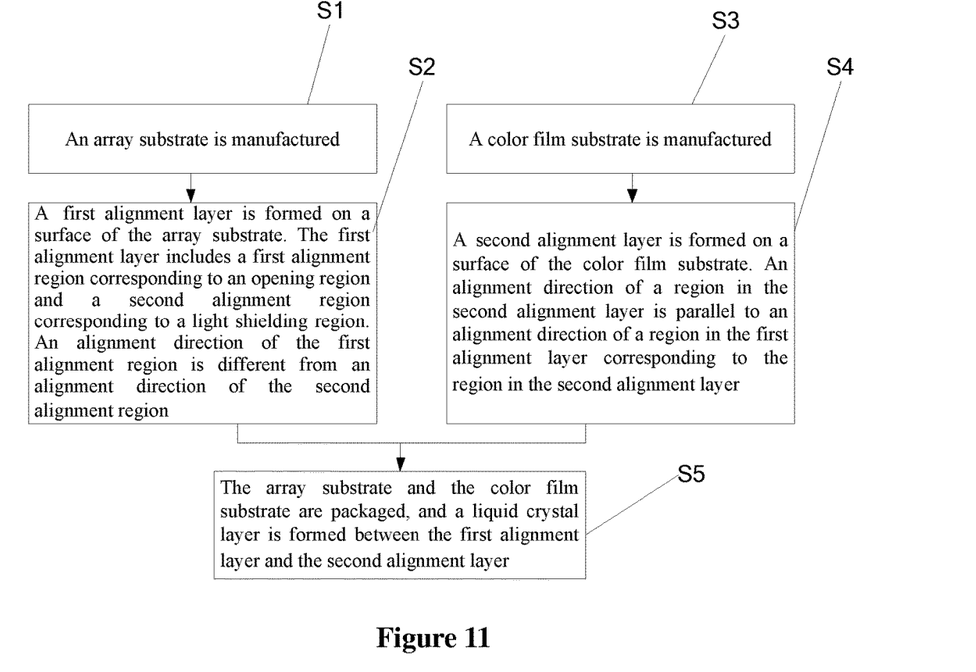
FIG. 11 is a flow diagram of a method for manufacturing a liquid crystal display panel according to an embodiment of the present disclosure.

In addition, a method for manufacturing the liquid crystal display panel according to any one of the above embodiments is further provided. As shown in FIG. 11, the method for manufacturing the liquid crystal display panel includes step S1 to step S5.

In step S1, an array substrate is manufactured.

In step S2, a first alignment layer is formed on a surface of the array substrate. The first alignment layer includes a first alignment region corresponding to an opening region and a second alignment region corresponding to a light shielding region. An alignment direction of the first alignment region is different from an alignment direction of the second alignment region.

In step S3, a color film substrate is manufactured.

In step S4, a second alignment layer is formed on a surface of the color film substrate. An alignment direction of a region in the second alignment layer is parallel to an alignment direction of a region in the first alignment layer corresponding to the region in the second alignment layer.

In step S5, the array substrate and the color film substrate are packaged, and a liquid crystal layer is formed between the first alignment layer and the second alignment layer.

It should be noted that, in the embodiments of the present disclosure, the array substrate and the color film substrate are manufactured separately. Therefore, in a process of manufacturing the liquid crystal display panel, the array substrate may be manufactured first and then the color film substrate is manufactured, alternatively the color film substrate may be manufactured first and then the array substrate is manufactured, alternatively the array substrate and the color film substrate may be manufactured simultaneously, which is not limited in the present disclosure, as the case may be.

Based on any one of the embodiments described above, in an embodiment of the present disclosure, the forming the first alignment layer on the surface of the array substrate includes: forming an alignment film on the surface of the array substrate; and performing regional alignment on the alignment film to form the first alignment layer, where the first alignment layer includes the first alignment region corresponding to the opening region and the second alignment region corresponding to the light shielding region, and the alignment direction of the first alignment region is different from the alignment direction of the second alignment region.

Based on the embodiments described above, in an embodiment of the present disclosure, the first alignment layer is doped with a dichroic dye, that is, the first alignment layer not only has an alignment effect, but also has a polarization effect. In an embodiment of the present disclosure, the alignment direction of a region in the first alignment layer is identical to the polarization direction of the region in the first alignment layer. In the embodiment, the forming the first alignment layer on the surface of the array substrate further includes: performing regional polarization on the alignment film when performing the regional alignment on the alignment film to form a first polarization region corresponding to the first alignment region and a second polarization region corresponding to the second alignment region, a polarization direction of the first polarization region is different from a polarization direction of the second polarization region. In another embodiment of the present disclosure, the alignment direction of a region in the first alignment layer is different from the polarization direction of the region in the first alignment layer, in the embodiment, alternatively the forming the first alignment layer on the surface of the array substrate includes: performing regional polarization on the alignment film after performing the regional alignment on the alignment film to form the first polarization region corresponding to the first alignment region and the second polarization region corresponding to the second alignment region. Preferably, the regional alignment and the regional polarization are performed on the first alignment layer in one process, to simplify a manufacture procedure for the liquid crystal display panel, which is not limited in the present disclosure, as the case may be.

Similarly, based on any one of the embodiments described above, in an embodiment of the present disclosure, the forming the second alignment layer on the surface of the color film substrate includes: forming an alignment film on the surface of the color film substrate; and performing regional alignment on the alignment film to form the second alignment layer, the alignment direction of a region in the second alignment layer is parallel to the alignment direction of a region in the first alignment layer corresponding to the region in the second alignment layer.

Based on the embodiments described above, in an embodiment of the present disclosure, the second alignment layer is doped with a dichroic dye, that is, the second alignment layer not only has the alignment effect, but also has the polarization effect. In an embodiment of the present disclosure, the alignment direction of a region in the second alignment layer is identical to the polarization direction of the region in the second alignment layer. In the embodiment, the forming the second alignment layer on the surface of the color film substrate further includes: performing regional polarization on the alignment film when performing the regional alignment on the alignment film to form a second alignment layer, the alignment direction of a region in the second alignment layer is identical to the polarization direction of the region in the second alignment layer. In another embodiment of the present disclosure, the alignment directions of the second alignment layer are different from the polarization directions of the second alignment layer, in the embodiment, alternatively the forming the second alignment layer on the surface of the color film substrate includes: performing regional polarization on the alignment film after performing the regional alignment on the alignment film to form the second alignment layer, the alignment direction of a region in the second alignment layer is different from the polarization direction of the region in the second alignment layer. Preferably, the alignment direction of a region in the second alignment layer is identical to the polarization direction of the region in the second alignment layer, so that the regional alignment and the regional polarization are performed on the second alignment layer in one process, to simplify a manufacture procedure for the liquid crystal display panel, which is not limited in the present disclosure, as the case may be.

Based on any one of the embodiments described above, in an embodiment of the present disclosure, the method for manufacturing the liquid crystal display panel further includes: forming a cover plate on a side of the color film substrate deviating from the liquid crystal layer, preferable, the cover plate has a polarization effect at a location corresponding to the light shielding region in the cover plate.

In conclusion, in the liquid crystal display panel manufactured by the method for manufacturing the liquid crystal display panel according to the embodiments of the present disclosure, the first alignment layer includes the first alignment region corresponding to the opening region in the liquid crystal display panel and the second alignment region corresponding to the light shielding region in the liquid crystal display panel. The alignment direction of the first alignment region is different from the alignment direction of the second alignment region. The alignment direction of a region in the second alignment layer is parallel to the alignment direction of a region in the first alignment layer corresponding to the region in the second alignment layer, so that after the liquid crystal molecules in the liquid crystal layer turn when the voltage is applied to two sides of the liquid crystal layer, an angle between a long axis of the liquid crystal molecule in the opening region and a light transmitting direction is different from an angle between a long axis of the liquid crystal molecule in the light shielding region and the light transmitting direction. In this way, the color mixing and color cast phenomenon in the liquid crystal display panel is alleviated, and the probability of the color mixing and color cast phenomenon in the liquid crystal display panel is reduced.

Furthermore, in the liquid crystal display panel according to an embodiment of the present disclosure, initial alignment directions of the first alignment region and the second alignment region are set reasonably, and then an object of light shielding can be realized. Therefore a light shielding layer is not necessary in the liquid crystal display panel according to an embodiment of the present disclosure, and a manufacture procedure for the liquid crystal display panel is simplified, and production efficiency for the liquid crystal display panel is improved, and cost of the liquid crystal display panel is reduced.

Parts in the present specification are described herein in a progressive manner, with the emphasis of each part on the difference between it and the other part; hence, for the same or similar parts between the parts, one can refer to the other part.

The above description of the embodiments disclosed enables those skilled in the art to implement or use the present disclosure. Various modifications to these embodiments will be apparent to those skilled in the art, and the general principle defined herein can be implemented in other embodiments without departing from the spirit or scope of the disclosure. Therefore, the present disclosure is not limited to these embodiments described herein, but in accordance with the widest scope consistent with the principle and novel features disclosed herein.

The invention claimed is:

1. A liquid crystal display panel comprising:
a plurality of sub pixel regions, wherein each of the sub pixel regions comprises an opening region and a light shielding region surrounding the opening region, the liquid crystal display panel comprises:
an array substrate and a color film substrate disposed opposite to each other;
a liquid crystal layer between the array substrate and the color film substrate;
a first alignment layer on a side of the array substrate facing the liquid crystal layer, wherein the first alignment layer comprises a first alignment region corresponding to the opening region and a second alignment region corresponding to the light shielding region, and wherein an alignment direction of the first alignment region is different from an alignment direction of the second alignment region;
a second alignment layer on a side of the color film substrate facing the liquid crystal layer, wherein an alignment direction of a region in the second alignment layer is parallel to an alignment direction of a region in the first alignment layer corresponding to the region in the second alignment layer; and
a cover plate disposed on a side of the color film substrate deviating from the liquid crystal layer,
wherein in the light shielding region, a polarization direction of the cover plate is perpendicular to a polarization direction of the second alignment layer; and
wherein in the opening region, the cover plate is either not polarized or polarized having a polarization direction the same as the polarization direction of the second alignment layer.

2. The liquid crystal display panel according to claim 1, wherein each of the sub pixel regions comprises at least one pixel electrode, an angle θ1 is an angle between the alignment direction of the first alignment region and an extension direction of the pixel electrode, and an angle θ2 is an angle between the alignment direction of the second alignment region and the extension direction of the pixel electrode, wherein θ2−θ1 is greater than 0° and less than or equal to 10°.

3. The liquid crystal display panel according to claim 2, wherein the first alignment region comprises a plurality of sub alignment regions, and the sub alignment regions have a one-to-one correspondence with a plurality of sub pixels, and alignment directions of the sub alignment regions are identical.

4. The liquid crystal display panel according to claim 2, wherein the first alignment region comprises a plurality of sub alignment regions, and the sub alignment regions have a one-to-one correspondence with a plurality of sub pixels, and alignment directions of the sub alignment regions are not completely identical.

5. The liquid crystal display panel according to claim 4, wherein the plurality of sub pixels comprise a first sub pixel, a second sub pixel and a third sub pixel, and the first alignment region comprises a first sub alignment region corresponding to the first sub pixel, a second sub alignment region corresponding to the second sub pixel and a third sub alignment region corresponding to the third sub pixel; and
the first sub alignment region has a same alignment direction, the second sub alignment region has a same alignment direction, and the third sub alignment region has a same alignment direction.

6. The liquid crystal display panel according to claim 5, wherein the alignment direction of the first sub alignment region is different from the alignment direction of the second sub alignment region, and/or the alignment direction of the first sub alignment region is different from the alignment direction of the third sub alignment region, and/or the alignment direction of the second sub alignment region is different from the alignment direction of the third sub alignment region.

7. The liquid crystal display panel according to claim 4, wherein the plurality of sub pixels comprise a first sub pixel, a second sub pixel and a third sub pixel, and the first alignment region comprises a first sub alignment region corresponding to the first sub pixel, a second sub alignment region corresponding to the second sub pixel and a third sub alignment region corresponding to the third sub pixel; and
alignment directions of regions corresponding to different locations within the first sub pixel within the first sub alignment region are not completely identical, and/or alignment directions of regions corresponding to different locations within the second sub pixel within the second sub alignment region are not completely identical, and/or alignment directions of regions corresponding to different locations within the third sub pixel within the third sub alignment region are not completely identical.

8. The liquid crystal display panel according to claim 1, wherein in a case that the first alignment layer is doped with a dichroic dye and the second alignment layer is doped with a dichroic dye, a polarization direction of a region in the first alignment layer is vertical to a polarization direction of a region in the second alignment layer corresponding to the region in the first alignment layer.

9. The liquid crystal display panel according to claim 8, wherein the polarization directions of the first alignment layer are identical to the alignment directions of the first alignment layer, or the polarization directions of the second alignment layer are identical to the alignment directions of the second alignment layer.

10. The liquid crystal display panel according to claim 1, wherein the cover plate is doped with a dichroic dye at the location corresponding to the light shielding region in the cover plate.

11. The liquid crystal display panel according to claim 10, wherein a width of the cover plate at the location corresponding to the light shielding region in the cover plate is not less than a width of the color film substrate at a location corresponding to the light shielding region in the color film substrate.

12. The liquid crystal display panel according to claim 11, wherein the dichroic dye comprises one or more of an azo-dye, an anthraquinone dye, a biphenyl dye, a triphenyl dioxazine and derivative dye, a monomethine dye, a polymethine dye or a polycyclic dye.

13. A display device comprising a liquid crystal display panel according to claim 1.

14. A method for manufacturing a liquid crystal display panel, wherein the liquid crystal display panel comprises a plurality of sub pixel regions, each of the sub pixel regions comprises an opening region and a light shielding region surrounding the opening region, and the liquid crystal display panel further comprises:
an array substrate and a color film substrate disposed oppositely;
a liquid crystal layer between the array substrate and the color film substrate;
a first alignment layer on a side of the array substrate facing the liquid crystal layer, wherein the first alignment layer comprises a first alignment region corresponding to the opening region and a second alignment region corresponding to the light shielding region, and an alignment direction of the first alignment region is different from an alignment direction of the second alignment region;
a second alignment layer on a side of the color film substrate facing the liquid crystal layer, wherein an alignment direction of a region in the second alignment layer is parallel to an alignment direction of a region in the first alignment layer corresponding to the region in the second alignment layer;
the method for manufacturing the liquid crystal display panel comprises:
manufacturing an array substrate;
forming a first alignment layer on a surface of the array substrate, wherein the first alignment layer comprises a first alignment region corresponding to an opening region and a second alignment region corresponding to a light shielding region, and an alignment direction of the first alignment region is different from an alignment direction of the second alignment region;
wherein the forming the first alignment layer comprises:
forming an alignment film on the surface of the array substrate; and
performing regional alignment on the alignment film to form the first alignment layer, wherein the first alignment layer comprises the first alignment region corresponding to the opening region and the second alignment region corresponding to the light shielding region, and an alignment direction of the first alignment region is different from an alignment direction of the second alignment region;
wherein the first alignment layer is doped with a dichroic dye, the alignment direction of a region in the first alignment layer is identical to a polarization direction of the region in the first alignment layer,
wherein the forming the first alignment layer on the surface of the array substrate further comprises:
performing regional polarization on the alignment film when performing the regional alignment on the alignment film to form a first polarization region corresponding to the first alignment region and a second polarization region corresponding to the second alignment region, a polarization direction of the first polarization region is different from a polarization direction of the second polarization region;
manufacturing a color film substrate;
forming a second alignment layer on a surface of the color film substrate, wherein an alignment direction of a region in the second alignment layer is parallel to an alignment direction of a region in the first alignment layer corresponding to the region in the second alignment layer; and
packaging the array substrate and the color film substrate, and forming a liquid crystal layer between the first alignment layer and the second alignment layer.

15. A method for manufacturing a liquid crystal display panel, wherein the liquid crystal display panel comprises a plurality of sub pixel regions, each of the sub pixel regions comprises an opening region and a light shielding region surrounding the opening region, and the liquid crystal display panel further comprises:
an array substrate and a color film substrate disposed oppositely;
a liquid crystal layer between the array substrate and the color film substrate;
a first alignment layer on a side of the array substrate facing the liquid crystal layer, wherein the first alignment layer comprises a first alignment region corresponding to the opening region and a second alignment region corresponding to the light shielding region, and an alignment direction of the first alignment region is different from an alignment direction of the second alignment region;
a second alignment layer on a side of the color film substrate facing the liquid crystal layer, wherein an alignment direction of a region in the second alignment layer is parallel to an alignment direction of a region in the first alignment layer corresponding to the region in the second alignment layer;
the method for manufacturing the liquid crystal display panel comprises:
manufacturing an array substrate;
forming a first alignment layer on a surface of the array substrate, wherein the first alignment layer comprises a first alignment region corresponding to an opening region and a second alignment region corresponding to a light shielding region, and an alignment direction of the first alignment region is different from an alignment direction of the second alignment region;
wherein the forming the first alignment layer comprises:
forming an alignment film on the surface of the array substrate; and
performing regional alignment on the alignment film to form the first alignment layer, wherein the first alignment layer comprises the first alignment region corresponding to the opening region and the second alignment region corresponding to the light shielding region, and an alignment direction of the first alignment region is different from an alignment direction of the second alignment region;

wherein the first alignment layer is doped with a dichroic dye, the alignment direction of a region in the first alignment layer is different from a polarization direction of the region in the first alignment layer, wherein the forming the first alignment layer on the surface of the array substrate further comprises:

performing regional polarization on the alignment film after performing the regional alignment on the alignment film to form a first polarization region corresponding to the first alignment region and a second polarization region corresponding to the second alignment region;

manufacturing a color film substrate;

forming a second alignment layer on a surface of the color film substrate, wherein an alignment direction of a region in the second alignment layer is parallel to an alignment direction of a region in the first alignment layer corresponding to the region in the second alignment layer; and packaging the array substrate and the color film substrate, and forming a liquid crystal layer between the first alignment layer and the second alignment layer.

* * * * *